Sept. 12, 1950        J. R. SCHAFFER        2,522,136
RUBBER-TO-METAL ADHESION
Filed Sept. 11, 1945

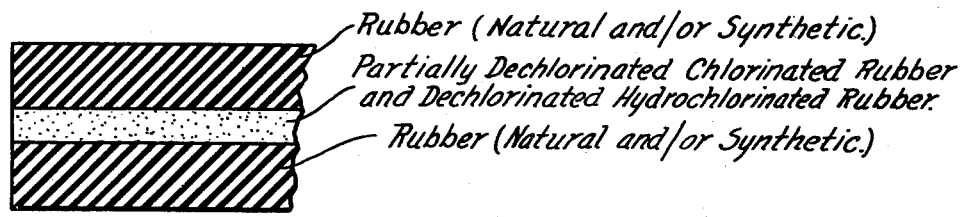

Fig-1
- Rubber (Natural and/or Synthetic.)
- Partially Dechlorinated Chlorinated Rubber and Dechlorinated Hydrochlorinated Rubber.
- Rubber (Natural and/or Synthetic.)

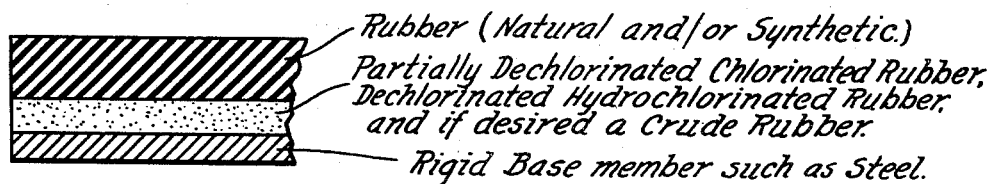

Fig-2
- Rubber (Natural and/or Synthetic.)
- Partially Dechlorinated Chlorinated Rubber, Dechlorinated Hydrochlorinated Rubber, and if desired a Crude Rubber.
- Rigid Base member such as Steel.

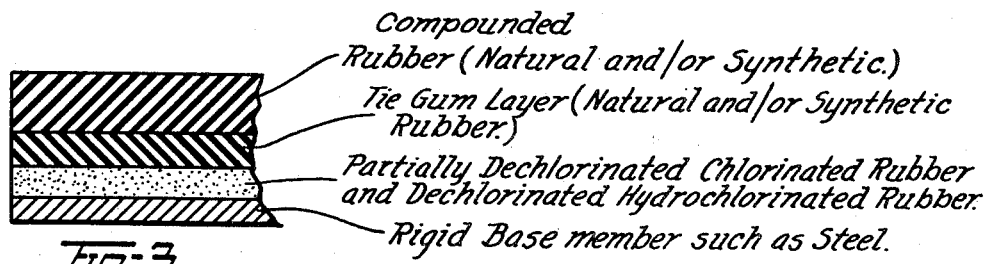

Fig-3
- Compounded Rubber (Natural and/or Synthetic.)
- Tie Gum Layer (Natural and/or Synthetic Rubber.)
- Partially Dechlorinated Chlorinated Rubber and Dechlorinated Hydrochlorinated Rubber.
- Rigid Base member such as Steel.

Inventor
James R. Schaffer
By Robert W. Furlong
Atty.

Patented Sept. 12, 1950

2,522,136

UNITED STATES PATENT OFFICE 2,522,136

RUBBER-TO-METAL ADHESION

James R. Schaffer, Akron, Ohio, assignor to The B. F. Goodrich Company, New York, N. Y., a corporation of New York Application September 11, 1945, Serial No. 615,704

17 Claims. (Cl. 154—130)

This invention relates to the uniting of rubber and the like to metallic and similar surfaces and particularly to an adhesive cement for that purpose.

One of the best known methods of uniting rubber and the like to metallic and similar surfaces is to plate the metallic surface with brass, apply a coating of a rubber cement, and then vulcanize a layer of rubber to the prepared surface. This method is not entirely satisfactory because it is expensive due to the cost of the brass plating operation and due to adhesion failures caused by contamination of the brass plating solution or by changes in the strength of the plating bath. There are other methods involving the use of adhesives made of cyclicized rubber derivatives together with intervening layers of tie-gum rubber. These latter methods do not produce rubber to metal bonds which are strong and durable enough to resist conditions of shock or impact. Still other methods possess serious disadvantages such as limitations of the types of rubber capable of being adhered, spotty and unreliable adhesion results in the factory, difficulty of control, health and safety hazards in their use, and an undesirable multiplicity of operations.

It is an object therefore of this invention to provide a method of uniting rubber and the like to metallic and similar surfaces which will not suffer from the above described disadvantages but which will be economical and provide superior and more reliable adhesion with a minimum of health and safety hazards in its use.

It is a further object of this invention to simplify the method of rubber to metal adhesion by providing a method by which all types of rubber compounds may be adhered to metallic and similar surfaces.

I have discovered that a rubber may be firmly and tenaciously adhered to a metallic surface by applying a new adhesive cement to a clean metal surface, applying vulcanizable rubber to the adhesive coated surface and vulcanizing the assembly. The adhesive cement used in the method of my invention preferably comprises a solution in a volatile solvent of a mixture consisting of a partially decomposed chlorinated rubber, a dechlorinated hydrochlorinated rubber, preferably a small proportion of a crude rubber, and minor proportions of certain compounding ingredients such as carbon black or other coloring and reinforcing pigments, age-resisting compounds, and the like.

I have further discovered that the partially decomposed chlorinated derivatives of synthetic rubbers may be substituted in the adhesive of this invention for the analogous partially decomposed natural rubber derivatives with much the same results and in some instances, for the adhesion of particular synthetic rubbers to metal, the adhesives made from certain synthetic rubber derivatives give particularly satisfactory results.

The partially decomposed chlorinated rubbers or Component A of the adhesive of this invention may be any of the derivatives prepared by removing a small proportion of chlorine from a fully saturated chlorinated rubber. The fully saturated chlorinated rubbers used to prepare the above-described partially decomposed derivatives may be any of the chlorinated natural rubbers containing 65% or more chlorine or any of the fully saturated chlorinated synthetic rubbers prepared by known methods such as by passing gaseous chlorine into a dilute solution of the rubber. The partial decomposition of the fully chlorinated rubber may be accomplished in a number of ways, for example, by passing gaseous ammonia into a solution of the chlorinated rubber for a time sufficient to remove a small proportion of the chlorine. Similar results may be obtained by treating a solution of the chlorinated rubber with zinc dust or simply by heating the chlorinated rubber in solution. Equally good results have been obtained by milling the solid chlorinated rubber on a heated rubber roll-mill for a time sufficient to cause the desired partial decomposition. Still other methods of producing the partially decomposed chlorinated rubbers are possible.

The dechlorinated hydrochlorinated rubbers or Component B of the adhesive of this invention may be any of the derivatives prepared by removing all or substantially all of the chlorine from fully hydrochlorinated rubber. A fully hydrochlorinated rubber is a tough and horny material which is not effective in an adhesive of this invention but when all or substantially all of the chlorine is removed the rubber-like properties are regenerated and unexpectedly the material becomes of value in an adhesive of this invention.

The adhesive cement of this invention is preferably made by adding the separately prepared derivatives, the crude rubber, and the desired compounding ingredients to a sufficient quantity of a volatile solvent to make a solution of proper consistency for any desired method of application such as brushing, spraying, or spreading. It has also been found that the adhesive cement may be made by preparing Component B, mixing Component B with the fully chlorinated rubber in solution and then preparing the partially decomposed chlorinated rubber (Component A) by treating the solution with anhydrous ammonia in gaseous form. The latter method eliminates the steps of isolating the partially decomposed chlorinated rubber and later redissolving it again in the preparation of the cement.

In order that the invention may be better understood, reference should be had to the accompanying drawing, which is intended to be illustrative only and not as limiting the invention. Fig. 1 represents a rubber composition, either natural or synthetic, adhered to a second rubber composition, which also may be natural or synthetic, by an adhesive layer comprising a partially dechlorinated chlorinated rubber (Component A) and a dechlorinated hydrochlorinated rubber (Component B). Fig. 2 represents an alternative manner of utilizing the adhesive composition of this invention comprising a natural or synthetic rubber composition adhered to a rigid base member such as steel using an adhesive layer comprising partially dechlorinated chlorinated rubber, a dechlorinated hydrochlorinated rubber, and if desired, a crude rubber. Fig. 3 represents still another manner of adhering a compounded rubber, either natural or synthetic, to a rigid base member using a tie gum layer or layer of gum rubber deposited from a cement of uncompounded natural or synthetic rubber next to the compounded rubber and a layer of the adhesive composition of this invention next to the rigid base member. The relative thicknesses of the rubber layers and of the base member and the disposition of same shown in the drawing are chosen only to illustrate the invention and are not intended to be construed as a limitation of the invention.

The invention will now be described with further particularity with reference to a number of specific examples.

EXAMPLE 1

Component A, a partially decomposed chlorinated natural rubber, was prepared as follows:

500 grams of chlorinated natural rubber (65% chlorine) were dissolved in 2500 grams (2850 c. c.) of benzene. Anhydrous ammonia in gaseous form was passed into this solution for approximately 4 hours at a temperature of 25 degrees centigrade. The solution was then heated for a brief period to about 75 to 80 degrees centigrade to expel the excess ammonia. The derivative was precipitated by pouring the solution of derivative into ethyl alcohol and the product was dried in air. The dried product was found to contain approximately 59% chlorine.

Component B, a dechlorinated hydrochlorinated derivative of natural rubber was prepared as follows:

6 grams of finely divided rubber hydrochloride containing approximately 29% of chlorine were mixed with 20 grams of pyridine and heated in an autoclave at 130 degrees centigrade for 18 hours. The reaction product was precipitated by pouring the reaction mixture into water and the recovered product was washed repeatedly with water and dilute acetic acid before drying. Analysis of the dried product revealed that it contained about 1.3% of chlorine.

An adhesive mixture was made by adding 6 parts of Component A and 1 part of Component B to a sufficient quantity of benzene to give a concentration of about 20% solids. The mixture showed good adhesive properties for bonding a gum rubber composition to metal.

As described above, one component may be prepared in situ after compounding with the other constituents of the cement. In the example below, Component A or the partially decomposed chlorinated rubber is prepared in situ.

EXAMPLE 2

Component B 100 grams of finely divided rubber hydrochloride (about 30% chlorine) were reacted with 600 grams of pyridine in an electrically heated and agitated autoclave at 140±10 degrees centigrade for about 10 hours. The mixture was cooled and the reaction product recovered by pouring the mixture into an excess of water. The product was washed several times with water and dried in air at room temperature. Upon analysis the dried product was found to contain about 2% of chlorine. 0.5% of phenyl β napthylamine (an age-resistor) was milled into the product on a roll mill.

An adhesive was prepared by dissolving 4.25 grams of Component B obtained by the above procedure and 4.25 grams of pale crepe rubber in 100 grams of toluene. 51 grams of this solution were mixed with 48 grams of chlorinated rubber, 15 grams of carbon tetrachloride, 10 grams of ethyl acetate, and 136 grams of toluene. Anhydrous ammonia in gaseous form was bubbled into the mixture with stirring for 1 hour. The cement was freed of excessive ammonia by heating it to 75 to 80 degrees centigrade. The product was a cement which was in all respects similar to the cement of Example 1.

Component A, the partially decomposed chlorinated rubber may be prepared by heating a solution of the chlorinated derivative or by hot-milling the solid chlorinated rubber. Examples 3 and 4 illustrate the above-described methods.

EXAMPLE 3

Component A 100 grams of chlorinated rubber (65% chlorine) were plasticized with 40 grams of diethylene glycol butyl ether acetate, and 10 grams of carbon black were added on the mill rolls at 260 degrees Fahrenheit. The mass was milled for 10 minutes. The final product contained about 61 percent chlorine (based upon the chlorinated rubber).

Component B

This dechlorinated hydrochlorinated rubber was made by heating finely divided rubber hydrochloride with pyridine for 3 hours at reflux. The product was isolated, washed with water, air dried, and upon analysis was found to contain 5% chlorine.

An adhesive cement was made by adding 96 grams of Component A, 16 grams of Component B and 8 grams crepe rubber to sufficient solvent to produce a cement of the proper consistency.

EXAMPLE 4

Component A was prepared as follows:

50 grams of chlorinated rubber (65% chlorine), 100 grams of xylene, 4 grams of dibutyl phthalate, 20 grams of carbon tetrachloride, and 26 grams of dipentene were stirred together until the chlorinated rubber was dissolved. The solution was then heated at 95 degrees centigrade for 2 hours. The isolated product contained 60% chlorine.

Component B, was the same as in Example 1.

An adhesive was made by the procedure and proportions of Example 1 and found to be a good rubber to metal adhesive. The following rubber composition is illustrative of one type of composition that may be adhered to metal by the adhesive of Example 4:

| Ingredients: | Parts by weight |
|---|---|
| Crepe rubber | 89.25 |
| Sulfur | 2.00 |
| Age-resistor (phenyl β naphthylamine) | 1.00 |
| Zinc-oxide masterbatch (20% rubber) | 1.25 |
| Tetramethyl thiuram disulfide masterbatch (95% rubber) | 6.00 |
| Rosin oil | 0.50 |

Cure: 30 min. @ 260° F. in a conventional curing press.

Examples 5 through 7 illustrate the use of alkaline materials other than pyridine in the preparation of Component B.

EXAMPLE 5

*Component A*

This component was the same as Component A of Example 4.

*Component B*

100 grams of finely divided rubber hydrochloride (about 30% chlorine) were mixed with commercial grade sodium meta silicate and heated for 18 hours at 130 degrees centigrade. The isolated reaction product was found upon analysis to contain about 4.8% chlorine.

An adhesive was made by mixing 96 grams of Component A, 16 grams of Component B and 8 grams of crepe rubber with sufficient solvent to make a solution of 20% solids. The adhesive was a good rubber to metal adhesive for gum rubber stocks of the type illustrated in Example 4.

EXAMPLE 6

*Component A*

This component was the same as the Component A of Example 3.

*Component B*

Rubber hydrochloride (30% chlorine) in finely divided form was treated with 30% sodium hydroxide solution by heating for 6 hours at 180° centigrade in an autoclave. The final product contained 2.7% chlorine.

An adhesive was made by mixing 20 grams of Component B with 12½ grams of a rubber composition composed of 40 parts pale crepe rubber and 60 parts carbon black. This mixture was added to 90 grams of Component A, 15 grams of acetonyl acetone, 50 grams of carbon tetrachloride, and 300 grams xylene. The mixture gave good adhesion of rubber compounds to metal.

EXAMPLE 7

*Component A*

This component was the same as the Component A of Example 3.

*Component B*

Finely divided rubber hydrochloride (30% chlorine) was fused with a 50–50 mixture of sodium hydroxide and potassium hydroxide for 30 minutes in an iron pot. The product after isolation, washing and drying was found to contain about 0.15% chlorine. The product was soft and rubber-like in appearance.

An adhesive was made by mixing 21 grams of Component B, 7 grams of pale crepe rubber and 9.8 grams of channel black on a roll mill and dispersing in 200 grams of xylene, 100 grams of carbon tetrachloride, and 32 grams of dipentene. 6.5 grams of this solution were mixed with 2.5 grams of Component A in solution and stirred. The product gave excellent adhesion of the following types of rubber composition to blasted steel.

| Ingredients: | Parts by weight |
|---|---|
| Smoked sheet rubber | 200.0 |
| Mercaptobenzothiazole | 0.6 |
| Benzothiazyl disulfide | 1.2 |
| Di ortho tolyl guanidine | 0.2 |
| Sulfur | 4.0 |
| Carbon black | 112.0 |
| Softener | 10.0 |
| Zinc oxide | 6.0 |
| Age-resistor | 3.0 |

Cure: 30 minutes at 292° F. in a conventional press.

The following synthetic tire-tread compound can also be adhered to blasted steel by the adhesive of this invention.

| Ingredients: | Parts by weight |
|---|---|
| GRS (75 butadiene-1,3–25 styrene) | 200.0 |
| Benzothiazyl-2 cyclohexyl-sulfenamide (accel.) | 2.0 |
| Diphenyl guanidine | 0.3 |
| Sulfur | 4.0 |
| Carbon black | 123.0 |
| Softener | 10.0 |
| Zinc oxide | 6.0 |
| Age-resistor (phenyl β naphthylamine) | 2.0 |

Cure: 30 minutes at 292° F. in a conventional press.

Examples 8 and 9 illustrate the use of other natural rubber-like materials such as guayule and balata to prepare Component B.

EXAMPLE 8

*Component A*

This component was the same as the Component A of Example 3.

*Component B*

Guayule hydrochloride in finely divided form was heated with pyridine for 7 hours at 140 degrees centigrade in an autoclave. The reaction product was rubber-like and soft and upon analysis was found to contain 0.07% chlorine.

An adhesive was prepared by a procedure and proportions similar to that of Example 7. The adhesive was in all respects similar to one made entirely of natural rubber derivatives.

EXAMPLE 9

*Component A*

This component was the same as Component A of Example 3.

*Component B*

Balata hydrochloride was heated with pyridine for 17 hours at 145 degrees centigrade in an autoclave. The final product after separation, washing and drying was found by analysis to have had all its chlorine removed. This derivative was similar in adhesive effect and appearance to dechlorinated rubber hydrochloride made from crepe rubber.

EXAMPLE 10

Component A

A chlorinated neoprene (polychloroprene) containing 68 to 70% chlorine was heat-treated by milling on a roll mill for 5 minutes at 260 degrees Fahrenheit. The final product contained about 65% chlorine (based upon the chlorinated rubber).

Component B

This component was the same as the Component B of Example 3.

An adhesive was made according to the procedure of Example 3 and was found to be a good rubber to metal adhesive for neoprene compositions.

EXAMPLE 11

Component A

A chlorinated polymer of butadiene-1,3 and styrene (50–50) which contained 58% chlorine was milled for 5 minutes at 260° F. The final product contained 54% chlorine.

Component B

Same as the Component B of Example 1.

An adhesive was made by adding 4 parts of Component A and 1 part of Component B to sufficient solvent to give about 20% total solids. The adhesive was a good rubber to metal adhesive for compositions of natural rubber and the polymers of butadiene-styrene.

The adhesive cements of the above examples and others which may be made according to this invention, may be used with or without secondary rubbery cements and/or layers of tie-gum rubber between the adhesive and the layer of rubber.

The partially decomposed chlorinated rubber derivative (Component A herein) may contain various amounts of chlorine. A fully chlorinated rubber derivative containing 65% or more chlorine does not produce an adhesive of the type described in this invention which exhibits good adhesion to metal. However, when a small proportion of chlorine perhaps ½, 1, 1½, or 2 percent or more is removed from the fully chlorinated rubber derivative, the property of rubber to metal adhesion is observed. Excellent rubber to metal adhesion is obtained by the use of adhesives containing partially decomposed chlorinated rubber derivatives of progressively lower chlorine contents, but, when the chlorine content of the partially decomposed chlorinated rubber derivative reaches or goes below 50 to 55 percent, gelling of the solution is apt to take place and the value of the adhesive cement is diminished. It will be appreciated that the chlorine content at which gelling is apt to occur is not a sharp or definite point but is rather indefinite and dependent upon several variables which are not yet fully understood. The chlorine range of 50 to 55 is a region of instability, for a partially decomposed chlorinated rubber derivative may be prepared with 50 to 55% chlorine and no difficulty with gelling observed, but when compounded into the adhesive of this invention gelling is apt to occur upon standing.

The dechlorinated hydrochlorinated rubber of this invention is believed to be of different structure than crude rubber for Harries produced a dechlorinated rubber hydrochloride containing less than 1% chlorine which he called "alpha isorubber" to distinguish it from crude rubber. The dechlorinated rubber hydrochloride for use in this invention need not be a true "alpha isorubber" but may contain considerably more chlorine. It has been found that a dechlorinated hydrochlorinated rubber of as much as about 5% chlorine is useful in the adhesive of this invention. Harries also produced "beta isorubber" which he made by hydrochlorinating "alpha isorubber" and then dechlorinating it again. It has been found that "beta isorubber" is closely similar to the dechlorinated rubber hydrochloride of this invention in adhesive effects and that a rubber derivative which has been carried through two cycles of successive hydrochlorination and dechlorination may be used in the adhesive cement of this invention.

The partially decomposed chlorinated rubber derivative of this invention may be made of any rubbery material, which possesses when unvulcanized, a structure made up of predominantly linear, long carbon chains comprising a multiplicity of intra-chain carbon to carbon double bonds including specifically such rubbery polymers of open-chain conjugated dienes as natural rubber, gutta percha, balata, guayule, poly-isoprene, neoprene (polychloroprene), polybutadiene, polypiperylene, butadiene acrylonitrile copolymers, GRS and other butadiene-styrene copolymers and in addition other polymers of butadiene-1,3 and its homologs with materials copolymerizable therewith such as acrylonitrile, styrene, methyl methacrylate, methylacrylate, isobutylene and other copolymerizable monomeric materials.

The dechlorinated hydrochlorinated rubber derivatives used in the adhesive cements of the invention may be made from any of the rubbery polymers of open-chain conjugated dienes including the naturally occurring rubbery materials such as hevea, balata, gutta percha, guayule and the like and synthetic rubbery materials which will react similarly with hydrochloric acid to form hydrochlorinated derivatives.

The adhesive cement of this invention may contain a minor proportion of a crude rubber, either natural or synthetic including any of the materials enumerated just above and in addition such rubber-like materials as polyisobutylene and the like. The crude rubber appears to function as a plasticizer for the rubber derivative and is thought to increase the adhesion of the cement layer to the superposed layer of rubber compound. The proportion of the crude rubber will depend somewhat on the composition of Component B as will be discussed below.

The proportions of Component A (chlorinated rubber derivative) and Component B (partially hypochlorinated rubber derivative) may be varied from as low as 3 parts of Component A to 1 part of Component B to as high as 6 parts of A to 1 part of B. Four parts of Component A to one part of Component B has been found to give particularly satisfactory results. The proportions of Components A and B may be varied with the addition of varying proportions of crude rubber and other compounding agents. For instance, if proportions of Component A to Component B are as much as 6 to 1, sufficient crude rubber may be added so that the proportion of Component A to the sum of Component B and the crude rubber is substantially 4 to 1.

I have found that with dechlorinated hydrochlorinated rubbers of low chlorine content it is not essential to add crude rubber. It will be appreciated, however, that it is to be desired to use a Component B having at least 1½, 2½ to 3% chlorine (necessitating the admixture of crude rubber) for in this manner the amount of Component B necessary is decreased, thereby reducing the cost of the adhesive.

The compounding ingredients that may be used are carbon black, coloring pigments, age resistors, and the like. An organic age-resistor is a desirable component if long service of the composite article is desired but only small proportions of these compounds need be used as is well known in the rubber art. The age-resisting compounds which may be used are phenyl β naphthylamine, phenyl α naphthylamine, diphenyl para phenylene diamine and the like or mixtures of the above or with any other age-resistors known to the art.

The solvents which may be used alone or in combination in an adhesive cement of this invention are xylene, benzene, carbon tetrachloride, chloroform, dipentene, cymene and other common solvents for the chlorinated and hydrochlorinated natural and synthetic rubbers as well as small quantities of acetone, ketones, gasoline, esters such as butyl acetate and alcohols such as methyl and ethyl alcohol.

The adhesive of this invention has made possible a simple and economically feasible process of rubber to metal adhesion. With this cement it is possible to adhere to metal compositions of both the pure gum and carbon black reinforced types containing either natural or synthetic rubbers.

Although especially valuable for adhering rubber to metal, for which the partially decomposed chlorinated rubbers and the dechlorinated hydrochlorinated rubbers appear to have special affinity, the present invention also will be found useful in adhering rubbers to other rigid base members such as wood, hard molded rubbers and resins, glass and the like.

While the invention has been described with reference to certain specific embodiments and examples, it is not my intention to be limited thereto, for variations and modifications of the invention are possible without departing from the spirit and scope of the invention as defined in the appended claims.

I claim:

1. The method of bonding a vulcanizable rubber to a rigid base member which comprises coating said base member with at least one coating of an adhesive composition comprising from 3 to 6 parts by weight of a partially dechlorinated chlorinated rubber containing from 50 to 65% chlorine and made by removing chlorine from a fully chlorinated rubber, said fully chlorinated rubber being prepared by chlorination of an unvulcanized rubbery polymer of an open-chain conjugated diene having a structure made up of predominantly linear, long carbon chains comprising a multiplicity of intra-chain carbon-to-carbon double bonds, and one part of a dechlorinated hydrochlorinated rubber containing from 0 to 5% chlorine and made by removing chlorine from a fully hydrochlorinated rubber, said fully hydrochlorinated rubber being prepared by hydrochlorination of an unvulcanized rubbery polymer of an open-chain conjugated diene having a structure made up of predominantly linear, long carbon chains comprising a multiplicity of intro-chain carbon-to-carbon double bonds, applying a layer of a vulcanizable rubber to said adhesive-coated member, and vulcanizing the so-formed assembly 2. The method of adhering a vulcanizable rubber composition to a rigid base member which comprises coating said member with at least one coating of an adhesive comprising from 3 to 6 parts by weight of a partially dechlorinated chlorinated rubber containing from 55 to 64.5% chlorine and made by removing chlorine from fully chlorinated natural rubber, and one part by weight of a dechlorinated hydrochlorinated rubber containing from 0 to 5% chlorine and made by removing chlorine from a fully hydrochlorinated natural rubber containing about 30% chlorine, applying a layer of a vulcanizable rubber composition to said cemented-coated member, and vulcanizing the assembly.

3. The method of adhering a vulcanizable rubber composition to a rigid base member which comprises interposing between the rubber and the base member a bonding layer of a composition comprising from three to six parts by weight of a partially dechlorinated rubber containing from 55 to 64.5% chlorine and made by removing chlorine from a fully chlorinated rubber, said fully chlorinated rubber being prepared by chlorination of an unvulcanized rubbery copolymer of butadiene-1,3 and styrene, one part by weight of a dechlorinated hydrochlorinated rubber containing from 1.5 to 5% chlorine and made by removing chlorine from a fully hydrochlorinated rubber, said fully hydrochlorinated rubber being one prepared by hydrochlorination of an unvulcanized natural rubber, applying a layer of a vulcanizable rubber composition to said cement-coated member, and vulcanizing the so-formed assembly.

4. The method of adhering a vulcanizable rubber composition to a rigid base member which comprises covering said member with at least one coat of an adhesive cement comprising a solution in a volatile solvent of from 3 to 6 parts of a partially dechlorinated chlorinated rubber containing from 55 to 65.0% chlorine and made by removing chlorine from a fully chlorinated rubbery polychloroprene, one part of a dechlorinated hydrochlorinated rubber containing from 0 to 5% chlorine and made by removing chlorine from a fully hydrochlorinated natural rubber, applying a layer of said vulcanizable rubber composition to said cement-coated member, and vulcanizing the assembly.

5. The method of adhering a vulcanizable rubber composition to a steel surface which comprises covering said surface with a layer of an adhesive cement comprising a solution in a volatile solvent of from 3 to 6 parts by weight of a partially dechlorinated rubber chloride containing from 55 to 64.5% chlorine and made by removing chlorine from a fully chlorinated natural rubber containing 65 to 67% chlorine, one part by weight of a dechlorinated rubber hydrochloride containing from 1.5 to 3.0% chlorine and made by removing chlorine from a fully hydrochlorinated natural rubber, a sufficient quantity of a crude rubber to yield a composition in which the ratio of the weight of dechlorinated rubber chloride to the sum of the weights of dechlorinated rubber hydrochloride and crude rubber is substantially four to one, and an organic age resistor, applying a layer of said vulcanizable rubber composition to said cement-coated surface, and vulcanizing the assembly.

6. An adhesive composition comprising from 3 to 6 parts by weight of a partially dechlorinated chlorinated rubber containing from 50 to 65% chlorine and made by removing chlorine from a fully chlorinated rubber, said fully chlorinated rubber being one made by chlorination of an unvulcanized rubbery polymer of an open-chain conjugated diene having a structure made up of predominantly linear, long carbon chains comprising a multiplicity of intra-chain carbon-to-carbon double bonds and one part of a dechlorinated hydrochlorinated rubber containing from 0 to 5% chlorine and made by removing chlorine from a fully hydrochlorinated rubber, said fully hydrochlorinated rubber being made by hydrochlorination of an unvulcanized rubbery polymer of an open-chain conjugated diene having a structure made up of predominantly linear, long carbon chains comprising a multiplicity of intra-chain carbon-to-carbon double bonds.

7. An adhesive cement comprising from 3 to 6 parts by weight of a partially dechlorinated chlorinated rubber containing from 55 to 64.5% by weight of chlorine and made by removing chlorine from a fully chlorinated rubber, said fully chlorinated rubber being made by chlorination of a rubbery butadiene styrene copolymer, one part of a dechlorinated hydrochlorinated rubber containing from 0 to 5% chlorine and made by removing chlorine from a fully hydrochlorinated rubber, said fully hydrochlorinated rubber being made by hydrochlorination of an unvulcanized natural rubber, and a volatile solvent for said rubbers.

8. An adhesive cement comprising from 3 to 6 parts by weight of a partially dechlorinated chlorinated rubber containing from 55 to 64.5% by weight of chlorine and made by removing chlorine from a fully chlorinated natural rubber, one part of a dechlorinated hydrochlorinated rubber containing from 0 to 5% chlorine and made by removing chlorine from a fully hydrochlorinated natural rubber, and a volatile solvent for said rubbers.

9. An adhesive cement comprising from 3 to 6 parts by weight of a partially dechlorinated chlorinated rubber containing from 55 to 65.0% chlorine and made by removing chlorine from a fully chlorinated rubbery polychloroprene containing from 68 to 70% chlorine, one part of a dechlorinated hydrochlorinated rubber containing from 0 to 5.0% chlorine and made by removing chlorine from a fully hydrochlorinated natural rubber, and a volatile solvent for said rubbers.

10. An adhesive cement comprising from 3 to 6 parts by weight of a partially dechlorinated rubber chloride containing from 55 to 64.5% chlorine and made by removing chlorine from a fully chlorinated natural rubber containing from 65 to 67% chlorine, one part of a dechlorinated hydrochlorinated rubber containing from 0 to 5% chlorine and made by removing chlorine from a fully hydrochlorinated natural rubber, a sufficient quantity of crude natural rubber to produce a final composition in which the ratio of the weight of the partially dechlorinated rubber chloride to the sum of the weights of dechlorinated rubber hydrochloride and crude rubber is substantially four to one, an organic age resistor, and a volatile solvent for said rubbers.

11. A composite product comprising a layer of a vulcanized rubber composition, a rigid base member, and an intermediate bonding layer comprising from 3 to 6 parts by weight of a partially dechlorinated rubber chloride containing from 50 to 65% chlorine and made by removing chlorine from a fully chlorinated rubber, said fully chlorinated rubber being prepared by the chlorination of an unvulcanized rubbery polymer of an open-chain conjugated diene polymer having a structure made up of predominantly linear long carbon chains comprising a multiplicity of intra-chain carbon-to-carbon double bonds, and one part by weight of a dechlorinated rubber hydrochloride containing from 0 to 5% chlorine and made by removing chlorine from a fully hydrochlorinated rubber, said fully hydrochlorinated rubber being prepared by hydrochlorination of an unvulcanized rubbery polymer of an open-chain conjugated diene polymer having a structure made up of predominantly linear, long carbon chains comprising a multiplicity of intra-chain carbon-to-carbon double bonds.

12. A composite product comprising a layer of a vulcanized rubber composition, a rigid base member, and an intermediate bonding layer comprising from 3 to 6 parts by weight of a partially dechlorinated rubber chloride containing from 55 to 64.5% chlorine and made by removing chlorine from a fully chlorinated natural rubber and one part by weight of a dechlorinated rubber hydrochloride containing from 0 to 5% chlorine and made by removing chlorine from a fully hydrochlorinated natural rubber.

13. A composite product comprising a layer of a vulcanized rubber composition, a rigid base member, and an intermediate bonding layer comprising from 3 to 6 parts by weight of a partially dechlorinated rubber chloride containing from 55 to 64.5% chlorine and made by removing chlorine from a fully chlorinated rubbery butadiene styrene copolymer and one part by weight of a dechlorinated rubber hydrochloride containing from 0 to 5% chlorine and made by removing chlorine from a fully hydrochlorinated natural rubber.

14. A composite product comprising a layer of a vulcanized rubber composition, a rigid base member, and an intermediate bonding layer comprising from 3 to 6 parts by weight of a partially dechlorinated rubber chloride containing from 55 to 65.0% chlorine and made by removing chlorine from a fully chlorinated polychloroprene and one part by weight of a dechlorinated rubber hydrochloride containing from 0 to 5% chlorine and made by removing chlorine from a fully hydrochlorinated natural rubber.

15. A composite product comprising a layer of a vulcanized rubber composition, a steel base member, and an intermediate bonding layer comprising from 3 to 6 parts by weight of a partially dechlorinated rubber chloride containing from 55 to 64.5% chlorine and made by removing chlorine from a fully chlorinated natural rubber and one part by weight of a dechlorinated rubber hydrochloride containing from 0 to 5% chlorine and made by removing chlorine from a fully hydrochlorinated natural rubber, a sufficient quantity of a crude rubber to yield a composition in which the ratio of the weight of the dechlorinated rubber chloride to the combined weights of the dechlorinated rubber hydrochloride and crude rubber is substantially four to one, and an organic age resistor.

16. An adhesive cement comprising from three to six parts by weight of a partially dechlorinated chlorinated rubber containing from 55 to 64.5% by weight of chlorine and made by removing chlorine from a fully chlorinated rubber, said fully chlorinated rubber being made by chlorination of an unvulcanized natural rubber, one part by weight of a dechlorinated hydrochlorinated rubber containing from 0 to 5% by weight of chlorine and made by removing chlorine from a fully hydrochlorinated rubber, said fully hydrochlorinated rubber being made by hydrochlorination of an unvulcanized guayule rubber, and a solvent for said rubbers.

17. An adhesive cement comprising from three to six parts by weight of a partially dechlorinated chlorinated rubber containing from 55 to 64.5% by weight of chlorine and made by removing chlorine from a fully chlorinated rubber, said fully chlorinated rubber being made by chlorination of unvulcanized natural rubber, one part by weight of a dechlorinated hydrochlorinated rubber containing from 0 to 5% by weight of chlorine and made by removing chlorine from a fully hydrochlorinated rubber, said fully hydrochlorinated rubber being made by hydrochlorination of an unvulcanized balata rubber, and a volatile solvent for said rubbers.

JAMES R. SCHAFFER.

REFERENCES CITED

The following references are of record in the file of this patent:

UNITED STATES PATENTS

| Number | Name | Date |
| --- | --- | --- |
| 2,148,831 | Raynolds | Feb. 28, 1939 |
| 2,149,926 | Moore | Mar. 7, 1939 |
| 2,170,947 | Habgood et al. | Aug. 29, 1939 |
| 2,227,991 | Winkelmann | Jan. 7, 1941 |
| 2,259,190 | Winkelmann | Oct. 14, 1941 |